United States Patent [19]

Fujikata

[11] Patent Number: 5,348,660
[45] Date of Patent: Sep. 20, 1994

[54] FILTER APPARATUS AND METHOD WITH FILTER EVALUATION BY SAMPLE SOLUTIONS

[75] Inventor: Shingo Fujikata, Kanagawa, Japan

[73] Assignee: Fuji Photo Film Co., Ltd., Kanagawa, Japan

[21] Appl. No.: 12,778

[22] Filed: Feb. 3, 1993

[30] Foreign Application Priority Data

Feb. 5, 1992 [JP] Japan .................. 4-047745

[51] Int. Cl.$^5$ .............. B01D 37/00; G01N 19/00
[52] U.S. Cl. .................. 210/767; 73/865.9; 118/610; 427/128; 427/549
[58] Field of Search ............ 118/600, 610; 427/127, 427/128, 548, 549; 210/137, 348, 497.01, 739, 767; 346/1.1; 73/86.9, 861

[56] References Cited

U.S. PATENT DOCUMENTS

| | | | |
|---|---|---|---|
| 3,836,395 | 9/1974 | Roller et al. | 427/548 |
| 4,849,103 | 7/1989 | Schmidt et al. | 210/497.01 |
| 4,985,284 | 1/1991 | Shibata et al. | 427/128 |
| 5,039,598 | 8/1991 | Abramsohn et al. | 346/1.1 |

FOREIGN PATENT DOCUMENTS 3077630  4/1991  Japan .................. 73/865.9

Primary Examiner—Joseph W. Drodge
Attorney, Agent, or Firm—Sughrue, Mion, Zinn, Macpeak & Seas

[57] ABSTRACT

A filter apparatus and coating method particularly adapted for thixotropic coating solutions and which yet permits the dead space within the housing of the filter apparatus for the secondary region to be reduced under a broad range of conditions at all times. The improved filter apparatus has a filter provided within a housing in such a way that it divides the interior of the housing into a primary region into which a coating to be filtered is supplied and a secondary region which receives the coating solution after it is filtered. The apparatus filters the coating solution just before it is coated on a flexible base. The apparatus is characterized in that the housing for the secondary region is designed in such a way that an index for measurement of the dead space within the housing satisfies the relation $T/\tau > 0.95$, where $\tau$ is an experimentally determined dimensionless number for the indicial response time of the housing and T is a dimensionless number of theoretical time.

3 Claims, 4 Drawing Sheets

INPUT SIDE

OUTPUT SIDE

FILTER APPARATUS AND METHOD WITH FILTER EVALUATION BY SAMPLE SOLUTIONS

BACKGROUND OF THE INVENTION

The present invention relates to a filter apparatus and a filtering method, more particularly, to a filter apparatus and filtering method with which non-Newtonian fluids such as magnetic coating solutions that have thixotropy and other time-dependent effects can be filtered before they are applied onto flexible bases.

Magnetic disks used as file memories for electronic computers and magnetic tape cassettes for use on VTRs are examples of magnetic recording media in common use that are manufactured by coating magnetic coating solutions on various types of bases including flexible tapes and rigid bases.

Magnetic coating solutions used in the production of such magnetic recording media are conventionally prepared by a process involving a step of mixing with a ball mill, a kneader, a sand grinder, etc. Because of the mixing step involved, the magnetic coating solutions contain not only balls and other worn particles that have occurred during mixing but also foreign matter that results from incomplete dispersion or reagglomeration of magnetic particles, resins, etc. In the prior art, these unwanted materials are eliminated by passing the magnetic coating solutions through a filter as appropriate before they are applied onto bases to form coated layers.

While various coating methods are known, high production rates have been achieved by performing continuous coating on a running flexible base with an applicator using reverse rollers or an extrusion-type applicator.

Two examples of a conventional filter apparatus are shown in FIGS. 6 and 7. As shown therein, a plurality of tubular filter cartridges 40 are juxtaposed in a filter housing 30, and a fluid passing through those filters is collected in the secondary space 31 of the housing before it is pumped through a predetermined piping system.

However, given the configuration of the secondary space 31 shown in FIGS. 6 and 7, the flowability of the coating solution may be low in a certain area, for instance, hatched region X, for the solution in entering the secondary space 31 compared with the flowability of the fluid in exiting the secondary space 31, depending on the position of an inlet 32 for the fluid coming from filter relative to the position of an outlet 33. If this problem occurs with a thixotropic coating solution that has a comparatively high solids content, the solution is prone to experience reagglomeration of particles into clumps in that region of low fluidity.

The higher the apparent viscosity of the coating solution, the greater the chance of it coagulating in the "dead space" of the secondary region (where fluidity is reduced). It may be safely assumed that the agglomerate is dislodged in portions and carried away by the flow of the coating solution. The agglomerate in the effluent acts substantially as foreign matter in the subsequent coating step (i.e., the coating solution is deposited on a base by passage through a coating head), thereby causing streaking and other defects on the coated surface of the base.

If a coating solution containing such an agglomerate is used to form a magnetic recording layer as in a magnetic tape, the resulting recording medium will have poor recording and reproducing characteristics, as typified by the occurrence of many dropouts during recording or reproduction.

It might be thought that this problem could be solved by designing a housing of such a configuration that there is no dead space in the secondary region 31; however, it is impossible as a practical matter to eliminate the dead space completely. The region of the dead space undergoes subtle changes depending upon various conditions such as the relative positions of the inlet through which the filtrate enters the secondary space and the outlet through which the filtrate emerges from the secondary space, the velocity of fluids and the viscosity of the coating solution. In particular, with fluids such as magnetic coating solutions that have a thixotropic effect (the viscosity changes in response to the shear force applied to the fluid), it has been very difficult to provide a filter apparatus that permits the dead space to be reduced under all conditions at all times merely by adopting a certain configuration. Under these circumstances, it has been common practice to determine the configuration of the housing of a filter apparatus individually on an empirical basis.

SUMMARY OF THE INVENTION

An object, therefore, of the present invention is to provide a filter apparatus and filtering method particularly adapted for thixotropic coating solutions and which yet permit the dead space within the housing for the secondary region to be reduced under a broad range of conditions at all times.

The above-stated object of the present invention can be attained by a filter apparatus and filtering method that employs a filter provided within a housing constructed in such a way that the filter divides the interior of the housing into a primary region into which a coating solution to be filtered is supplied and a secondary region which receives the coating solution after it is filtered, the apparatus filtering the coating solution just before it is coated onto a flexible base, the apparatus being characterized in that the housing for the secondary region is designed in such a way that an index for measuring the dead space within the housing satisfies the relation $T/\tau > 0.95$, where $\tau$ is an experimentally determined dimensionless value for the indicial response time of said housing and T is a dimensionless number of theoretical time.

The above and other objects of the invention can also be attained by a filter apparatus and filtering method to satisfy the relation $T/\tau > 0.95$, and which filters the coating solution, which is a fluid whose viscosity is variable with shear rate and satisfies the relation $\eta_1/\eta_2 \geqq 250$, where $\eta_1$ is the viscosity of the fluid at a shear rate of 20 cm$^{-1}$ and $\eta_2$ is the viscosity of the fluid at a shear rate of 46,500 cm$^{-1}$.

The term "indicial response time" as used herein is defined as follows: the housing of a filter apparatus is filled completely with a first coating solution A; then a second coating solution B (usually with a different color than the solution A to permit easy detection) is charged into the apparatus from the primary side (charge side) of the housing while, at the same time, both coating solutions are recovered from the secondary side (recovery side); the time required for the coating solution A within the housing to be replaced completely by coating solution B is the "indicial response time." In other words, at the instant the coating solution B is first charged into the housing, only the coating solution A will emerge from the secondary side, but as time passes, the coating solution B will gradually mix with the coating solution A until the proportions of the two solutions are reversed; the "indicial response time" is the time necessary for all of the coating solution A to be discharged from the housing.

DESCRIPTION OF THE PREFERRED EMBODIMENTS

Figure 1:
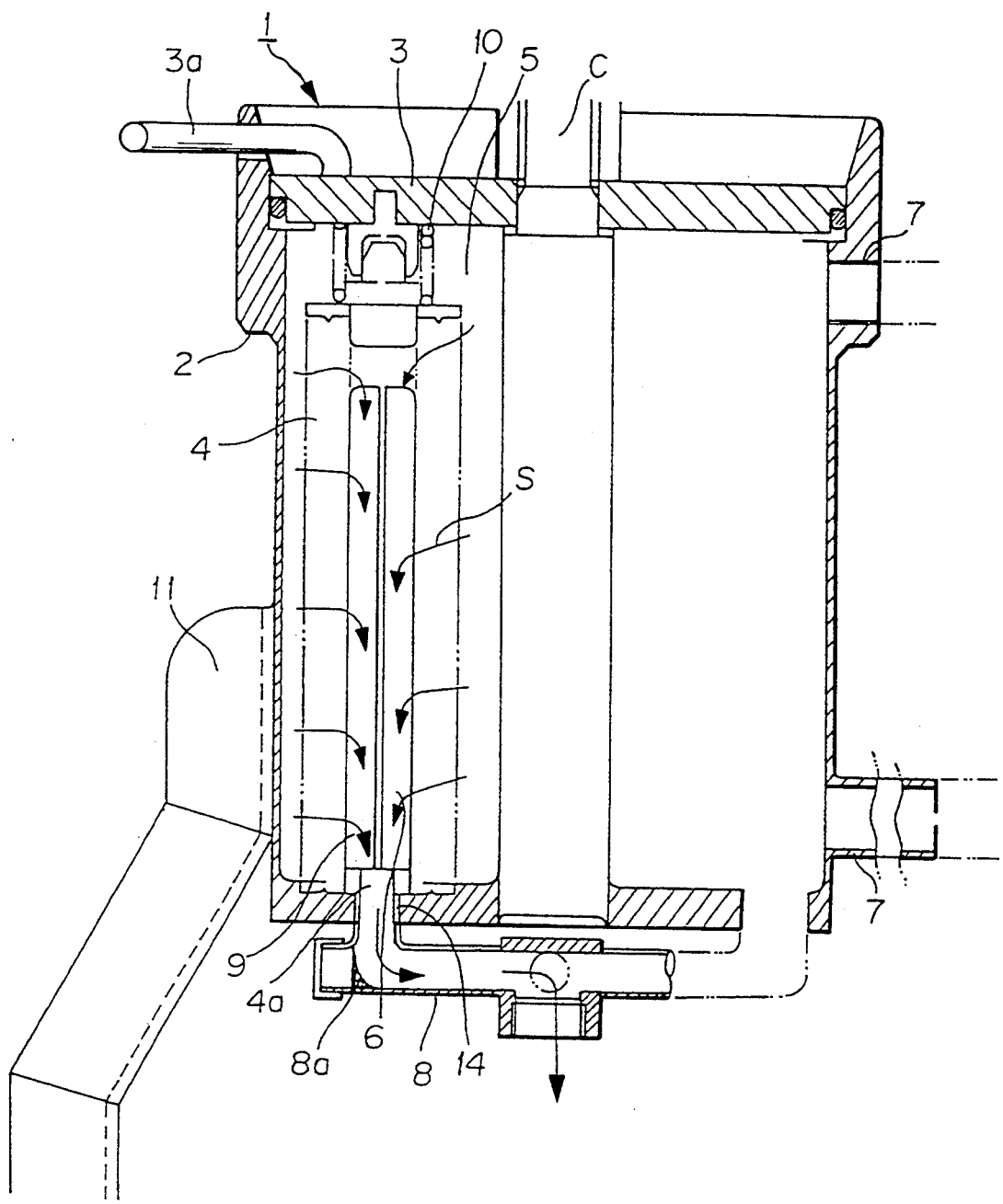
FIG. 1 shows a filter apparatus constructed according to a preferred embodiment of the present invention.

Preferred embodiments of the present invention will be described below with reference to the accompanying drawings. FIG. 1 is a cross-sectional view showing the essential part of a filter apparatus constructed according to a preferred embodiment of the present invention, and FIG. 2 is a diagram showing schematically a coating system using the filter apparatus of the present invention.

Figure 2:
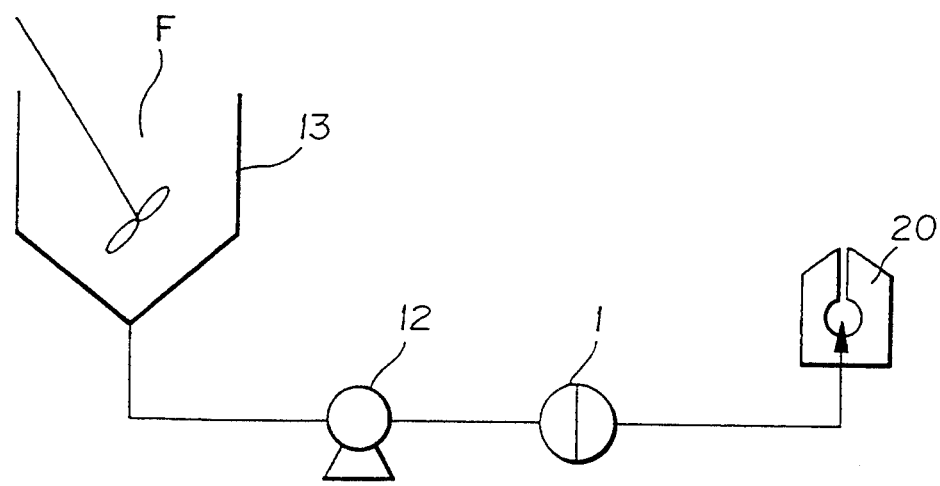
FIG. 2 is a diagram showing schematically a coating system incorporating the filter apparatus shown in FIG. 1.

The filter apparatus according to this embodiment of the present invention, generally indicated by 1 in FIG. 2 is provided in a coating step for forming a magnetic layer in the manufacture of magnetic tape. As shown in FIG. 2, a magnetic dispersion F is stirred in a stock tank 13, then supplied into the filter apparatus 1 by means of a feed pump 12, and freed of any foreign matter in the filter apparatus 1; the resulting clean coating solution is supplied to a die head 20.

The filter apparatus 1 shown in FIG. 1 has a generally cylindrical housing 2 that is secured in suitable positions to a mounting frame 11. The housing 2 contains a plurality of cylindrical filter cartridges 4 that are held in position by cartridge retainers 9 and which are arranged around the center line C. Each cartridge 4 has an opening 4a in the center of its lower end, which is in registry with an outlet 14 formed in the bottom of the housing 2 and through which the filtrate is to be recovered. A recovery pipe 8 is connected to the outlet 14. The upper end of the cartridge 4 is depressed by a cylindrical depressor 10 that receives a downward pressure provided by a lid 3. The lid 3 can be opened by holding on grip 3a whenever required as in the case of replacing the cartridge 4. The recovery pipe 8 has a curved corner member 8a provided on the inner surface of a bent portion so as to create a smooth fluid flow.

The magnetic dispersion F supplied by means of the feed pump 12 enters the primary space 5 of the housing 2 via a fluid supply port 7 provided on a lateral side of the housing 2. The incoming dispersion F is filtered as it passes through the cartridges 4, and the filtrate passes through the central channel of each cartridge 4 forming the secondary space 6 to flow into the recovery pipe 8.

The filter apparatus 1 is constructed so that no dead space can readily form in the housing for the secondary region. The secondary space 6 of the apparatus is primarily composed of the cylindrical space within each cartridge 4. When the magnetic dispersion F flows toward the outlets 14 by passing through the filtering walls of the lateral sides of cartridges 4 (as indicated by arrow S in FIG. 1), the volume of fluid passing through these filtering walls is uniform in all areas. In addition, the secondary passageways are formed by cylindrical spaces, which are nearly ideal as components of a fluid supply system (the exception being that they are slightly constricted at outlets 14). Hence, the behavior of the fluid flowing within the secondary space is stabilized during its supply to the housing.

Thus, it is evident that the quality of the magnetic dispersion F applied to a flexible base is largely dependent on the change in the quality of the coating solution after it is filtered. The present inventors hypothesized that the change in the quality of the filtered coating solution, namely, the change in its quality due to such factors as coagulation and gelation, is a function of the lapse of time after filtration and the rate of shear acting upon the filtered coating solution, and as a result introduced time dependency as an important element of the rheological characteristics of the coating solution.

Hence, the filtered magnetic dispersion F can immediately be used in coating without staying long within the secondary space 6. As a result, it is possible to eliminate a time factor that may cause recurrence of fluid coagulation within the secondary space 6.

A guide figure for the occurrence of fluid coagulation, namely, an index for measuring the dead space within the housing for the secondary region, may be expressed by the ratio of two dimensionless numbers, $T/\tau$, where $\tau$ is an empirical value for the indicial response time of housing 2 and T is a theoretical time. This ratio can be understood as a time-dependent parameter for the recurrence of fluid coagulation and, hence, can be employed for the structural design of the secondary space 6. The present inventors found that the coagulation of magnetic dispersion F in the secondary space 6 can be minimized by adopting a structure in which the ratio $T/\tau$ is made greater than 0.95.

As already mentioned, the term "indicial response time" (step response time) as used herein means the time taken for the first solution A placed in every part of the housing 2 to be replaced completely by the second solution B which is being charged into the housing while both solutions are recovered from the secondary side (recovery side).

This parameter can be determined by experimentation. A mean residence time ($\Theta$) of the coating solution may be determined from the transfer function G(S) of the system of interest due to indicial response. The transfer function may be derived as follows. Assume an impulse function (abrupt change from solutions A to B) is supplied as an input to the system of the housing containing the primary and secondary sides of a filter. Writing x(t) for the input and y(t) for the output (fluid from the filter outlet), the following relation holds: $x(t) \rightarrow G(s) \rightarrow y(t)$. By applying Laplace transformation to this relation with respect to t:

$$G(s) = Y(s)/X(x)$$

with G(s) being the transfer function of the system at issue.

Figure 8:
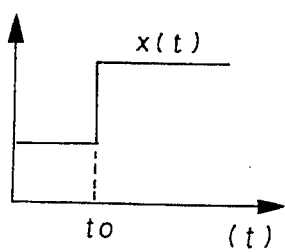
FIG. 8 illustrates the concept of a transfer function by showing diagrammatically what changes occur to a fluid on both input and output sides.
Figure 8:
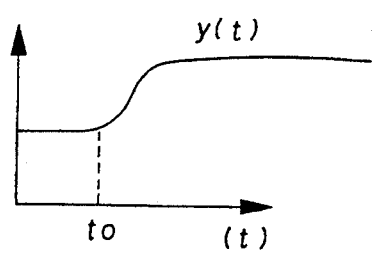

The concept of the transfer function is illustrated in FIG. 8, which shows the changes on the input side and on the output side. With reference to the illustrative case under consideration, the difference is plotted on the vertical axis to measure the relationship between the input and the output for solutions A and B, which are assumed to have an extreme difference in composition or characteristics.

Let us now assume a theoretical mean residence time (H) as determined by the following equation on the basis of the actual volume of the system, i.e., the volume of the housing (V), and the measured flow velocity (v):

$$V/v = H$$

If the indicial response time of the housing is written as (t), the dead space of the housing for the secondary region 6 can be estimated by $T/\tau$, where $\tau$ and T are respectively defined as follows:

Dimensionless time (experimental value) $(\tau) = t/\Theta$
Theoretical dimensionless time $(T) = t/H$ Thus, in the present invention, the dimensionless number, determined experimentally, of indicial response time $(\tau)$ and the dimensionless number of theoretical time (T) are compared as indices for measuring the dead space for the secondary region 6 so as to provide a very simple method of standardization for determining the structure of an effective filter apparatus for thixotropic coating solutions. By designing a structure that has a $T/\tau$ value greater than 0.95, the dead space within the housing for the secondary region can be reduced under a broad range of conditions at all times and, hence, thixotropic coating solutions can be filtered without experiencing any deterioration in its quality.

Further, the present inventors found that when the coating solution F had thixotropy (i.e., its viscosity changed with shear rate), the following two observations held good: the value of $T/\tau$ had a tendency to decrease more abruptly as the thixotropic effect of the coating solution F became more evident (i.e., a greater difference was observed between the viscosity under low shear rate and the viscosity under high shear rate); and a value that may be described as "percent change in apparent viscosity" can be expressed by the formula: viscosity under low shear rate $(\eta_1)$/viscosity under high shear rate $(\eta_2)$, and this value was dependent on the value of $T/\tau$.

Based on these findings, the present inventors continued their studies and discovered that when the fluid to be filtered had viscosity $\eta_1$ at a shear rate of 20 cm$^{-1}$ and viscosity $\eta_2$ at shear rate of 46,500 cm$^{-1}$, the filter apparatus of the embodiment under consideration, which was designed to satisfy $T/\tau > 0.95$, was capable of effecting filtration with minimum occurrence of re-agglomeration in the filtered coating solution.

Thus, in general, the greater the value of $\eta_1/\eta_2$ ($\eta_1$: viscosity at low shear rate; $\eta_2$: viscosity at high shear rate), the more thixotropic the fluid of interest is. The value of a shear rate 46,500 cm$^{-1}$ corresponds to the shear rate at the distal end of a die head of an extrusion type. Viscosities at the two shear rates can be measured with a Brookfield viscometer and a Rotovisco viscometer.

The description of the embodiment under consideration is directed to the case where the coating solution is a magnetic dispersion, but the present invention is not so limited, and it finds a broad range of applications for filtering non-Newtonian fluids including paints and coating solutions for producing photographic materials.

As described above, the filter apparatus of the present invention is constructed so that an index for measuring the dead space within the housing for the secondary region satisfies the relation $T/\tau > 0.95$, where $\tau$ is an experimentally determined dimensionless value of the indicial response time of the housing and T is the dimensionless number of theoretical time. Due to this structural design, a magnetic dispersion F filtered with the apparatus will flow while maintaining a state close to a laminar flow, and the occurrence of turbulence in the flow and, hence, stagnancy of the fluid within the secondary space 6, can be effectively prevented to insure that the filtered fluid is immediately usable in a coating operation. As a result, a time factor that would cause recurrence of fluid coagulation within the secondary space 6 is eliminated. If the coating solution filtered with the apparatus of the present invention is applied, there will be neither streaks nor pimple-like deformations formed on the coated surface, and a magnetic recording medium that suffers few dropouts can be produced. As a further advantage, the filter apparatus of the present invention is capable of filtering various kinds of paints to prepare coating solutions that can provide coated surfaces of good quality.

Actually, the filter apparatus satisfying the relation $T/\tau > 0.95$ can be manufactured by forming a round corner 8a shown in FIG. 1 to thereby eliminate a rectangular corner so that a cross section of the passageway through which the liquid flows does not change rapidly.

The following examples are provided for the purpose of further illustrating the present invention, but are in no way to be taken as limiting.

EXAMPLE 1

In this example, magnetic tape was prepared by the system shown in FIG. 2. The die head used was of an extrusion type, and application was effected without using backup rolls. Before the step of application, a coating solution having the formula shown below was filtered with the filter apparatus 1 shown in FIG. 1. In comparison (1), filtration was performed with a Model 5HE filter housing of STD Series manufactured by Poll Co.; in comparison (2), filtration was performed with a Brunswick-type filter housing manufactured by Nippon Roki Co., Ltd.

| Formula: | |
|---|---|
| Alloyed iron powder | 100 (parts) |
| Vinyl chloride/vinyl acetate/vinyl alcohol copolymer | 125 |
| Polyester polyurethane | 7.5 |
| Oleic acid | 2 |
| Butyl stearate | 1 |
| Alumina | 2 |
| Carbon black (10 μm in particle size) | 2 |
| Methyl ethyl ketone | 200 |
| Cyclohexanone | 100 |

The mixture of the ingredients listed above was subjected to thorough dispersing with a sand grinder;

thereafter, 6.5 parts of a triisocyanate compound was added and mixed well.

The magnetic coating solution thus prepared was put into the stock tank 13 shown in FIG. 2. As it was stirred at a suitable speed, the magnetic solution was sent to the filter apparatus 1 by means of the feed pump 12. The filtered magnetic solution was extruded through the die head 20 to be applied onto a polyester film (thickness: 15 μm, surface roughness: 0.1 μm) at a coating speed of 100 m/min to provide a coating 300 mm wide having a dry thickness of 5 μm. Finally, the magnetic coating was oriented and dried to prepare a sample of magnetic tape.

The filter cartridges used in the filter apparatus 1 were filters manufactured by Kanebo, Ltd., having an average pore size of 1 μm.

Figure 3:
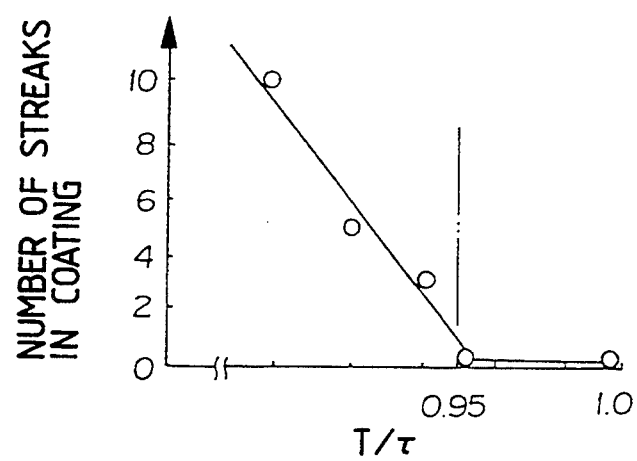
FIG. 3 is a graph showing the relationship between an index for measuring the dead space and the number of streaks formed in a coating on a magnetic tape.
Figure 4:
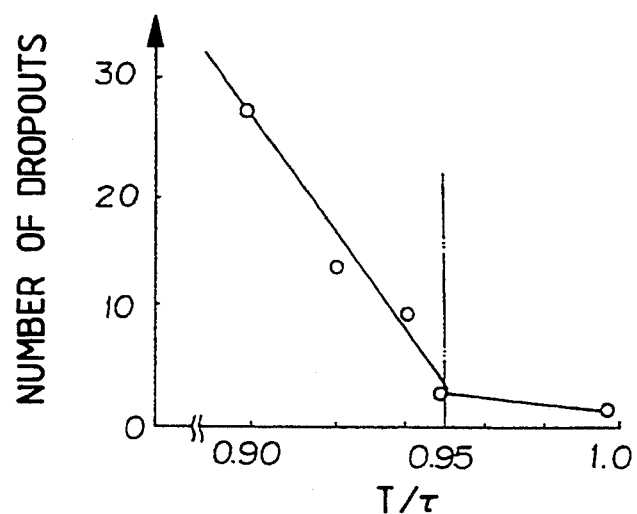
FIG. 4 is a graph showing the relationship between the index for measuring the dead space and a number of dropouts.

Under the conditions described above, a number of tape samples were prepared using the three types of filter apparatus. For each sample, the number of streaks in the coated layer (checked visually, per 150 m of coating length) and the number of dropouts (output decrease longer than 20 μsec and greater than 16 dB) were counted. Also, the values of $T/\tau$ were calculated for the respective filter housings used to prepare the samples. The results are shown in Table 1, the relationship between streaking and $T/\tau$ is depicted in FIG. 3, and the relationship between the number of dropouts (DO) and $T/\tau$ is depicted in FIG. 4. Sample No. 1 was prepared with corner member 8a provided in the recovery pipe 8 of the filter apparatus shown in FIG. 1, and Sample No. 2 was prepared without the corner member 8a. Numerical data for Samples Nos. 1 to 5 were mean values obtained by repeating five cycles of coating operation using the same filter housing.

TABLE 1

| Sample No. | $T/\tau$ for filter housing | Number of streaks per 150 m | DO/min longer than 20 μsec and greater than 16 dB |
|---|---|---|---|
| 1 | 1.0 | 0 | 2 |
| 2 | 0.95 | 0 | 3 |
| 3 | 0.94 | 3 | 9 |
| 4 | 0.92 | 5 | 14 |
| 5 | 0.90 | 10 | 27 |

As is clear from Table 1, FIGS. and 3, an improvement in the quality of coated surfaces and suppression of dropouts could be accomplished very effectively when $T/\tau$ was 0.95 or greater.

Example 2

In this example, a determination was made as to how the values of $T/\tau$ for the three types of filter housing, i.e., the filter housing according to the present invention used in Example 1, a Model 5HE, STD Series, filter housing manufactured by Poll Co. and used as comparison (1), and a Brunswick-type filter housing manufactured by Nippon Roki Co., Ltd. and used as comparison (2), would vary with a change in $\eta_1/\eta_2$. As coating solutions having different values of $\eta_1/\eta_2$, the following three formulas were used.

| Coating Solution A (for metal tape): | |
|---|---|
| Ferromagnetic alloy powder | 100 (parts) |
| MR 110 (SO₃Na-containing vinyl chloride resin) | 10 |
| UR 8300 (SO₃Na-containing polyurethane resin) | 10 |
| Polyisocyanate (Colonate L) | 5 |

| -continued | |
|---|---|
| Myristic acid | 1 |
| Butyl stearate | 2 |
| Methyl ethyl ketone | 150 |
| Butyl acetate | 150 |
| Coating Solution B (for broadcast-type magnetic tape): | |
| Co-containing α-Fe₂O₃ powder | 300 (parts) |
| Vinyl chloride resin (SO₃H epoxy-containing MR 110) | 38 |
| Polyurethane resin (Crisbon 7209) | 18 |
| Carbon black (Vulcan XC72; average particle size: 30 mμ) | 12 |
| Abrasive: α-Al₂O₃ (HIT 100) | 18 |
| Abrasive: Cr₂O₃ (average grain size: 0.1 μm) | 3 |
| Oleic acid | 3 |
| Cyclohexanone | 150 |
| Butyl acetate | 850 |
| tert-Butyl myristate | 3 |
| Polyisocyanate (Colonate 3040) | 21 |
| Stearic acid | 3 |
| Butyl acetate | 100 |
| Coating Solution C (for ½ inch magnetic tape): | |
| Alloyed iron powder | 100 (parts) |
| Vinyl chloride/vinyl acetate/vinyl alcohol copolymer | 12.5 |
| Polyester polyurethane | 7.5 |
| Oleic acid | 2 |
| Butyl stearate | 1 |
| Alumina | 2 |
| Carbon black (average particle size: 10 μm) | 2 |
| Methyl ethyl ketone | 200 |
| Cyclohexanone | 100 |
| Triisocyanate compound | 6.5 |

The value of $\eta_1/\eta_2$ was 200 in coating solution A, 250 in coating solution B, and 300 in coating solution C. The value of $T/\tau$ for each of the filter housings was determined with respect to those values of $\eta_1/\eta_2$. Symbol $\eta_1$ designates the viscosity at shear rate of 20 cm$^{-1}$ and $\eta_2$ designates the viscosity at shear rate of 16,500 cm$^{-1}$. These viscosities were measured with a Brookfield viscometer and a Rotovisco viscometer.

The results are shown in Table 2 below.

TABLE 2

| | Dependency of $T/\tau$ on $\eta_1/\eta_2$ of fluid | | |
|---|---|---|---|
| $\eta_1/\eta_2$ | 200 | 250 | 300 |
| STD Series of Poll Co. | 0.95 | 0.93 | 0.90 |
| MIDP type of Nippon Roki | 0.96 | 0.94 | 0.92 |
| Filter of the Invention | 0.98 | 0.97 | 0.96 |

As one can see from Table 2, the value of $T/\tau$ tends to drop sharply in the prior art filter housings as the degree of thixotropy of the fluid increases (the difference between the viscosity under low shear rate and the viscosity under high shear rate increases), and when $\eta_1/\eta_2$ was 250 and above, the value of $T/\tau$ dropped below 0.95. In contrast, the filter housing of the present invention insured $T/\tau$ values greater than 0.95 even when $\eta_1/\eta_2$ was 250 and above; as a result, it was capable of filtering the coating solution with minimum occurrence of reagglomeration in the filtrate.

EXAMPLE 3

In this example, a paint having the formula shown below (for preparing the polishing layer of abrasive tape) was applied. The layout of the coating system is shown in FIG. 2. The coating conditions were the same as those employed in Example 1. Prior to application, the paint was filtered with the filter apparatus 1 of the present invention, or Model 5HE filter housing of STD Series manufactured by Poll Co. (comparison (1)), or Brunswick type filter housing manufactured by Nippon Roki Co., Ltd. (comparison (2)).

| Formula: | |
|---|---|
| α-Fe$_2$O$_3$ abrasive (composed of grains with average size of 0.11 μm; hardness: 5.0 on Mohs scale) | 250 (parts) |
| Cr$_2$O$_3$ abrasive (composed of grains with average size of 0.3 μm; hardness: 8.5 on Mohs scale) | 75 |
| Vinyl chloride based resin (87% vinyl chloride; 3.5% epoxy group; 0.5% sodium sulfonate group) | 8.3 |
| Sulfonic acid-containing polyurethane resin (mol. wt. 25,000 per SO$_3$H) | 4.8 |
| Polyisocyanate | 8.6 |
| C$_{16}$H$_{33}$O (CH$_2$CH$_2$O)$_{10}$H (Emalex 110 of Nippon, Emulsion Co., Ltd.) | 2.9 |
| Methyl ethyl ketone | 110 |
| Cyclohexanone | 100 |

The prepared magnetic solution was put into the stock tank 13 shown in FIG. 2. As it was stirred at a suitable speed, the magnetic solution was sent to the filter apparatus 1 by means of the feed pump 12. The filtered magnetic solution was extruded through the die head 20 to be applied onto a polyester film (thickness: 15 μm, surface roughness: 0.1 μm) at a coating speed of 100 m/min to provide a coating 300 mm wide having a dry thickness of 5 μm. The magnetic coat was oriented and dried to prepare a sample of abrasive tape.

The filter cartridges used in the filter apparatus 1 were filters manufactured by Kanebo, Ltd., having an average pore size of 1 μm.

Figure 5:
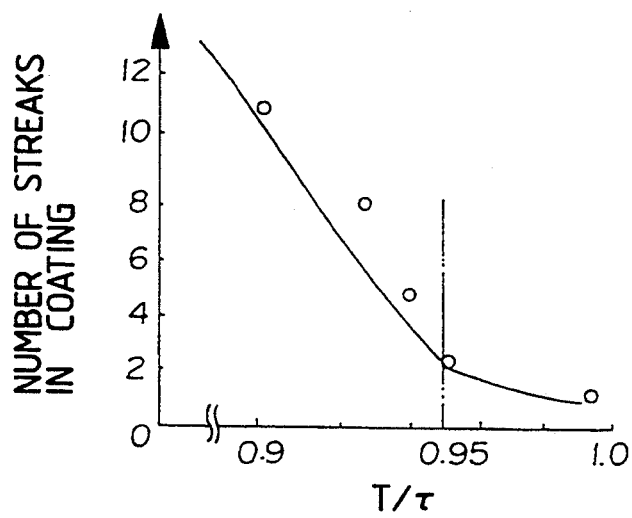
FIG. 5 is a graph showing the relationship between the index for measuring the dead space and the number of streaks in a coating on a abrasive tape.
Figure 6:
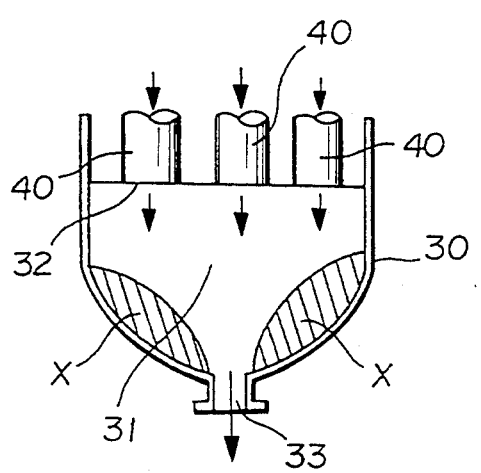
FIG. 6 is a partial sectional view of a prior art filter apparatus.
Figure 7:
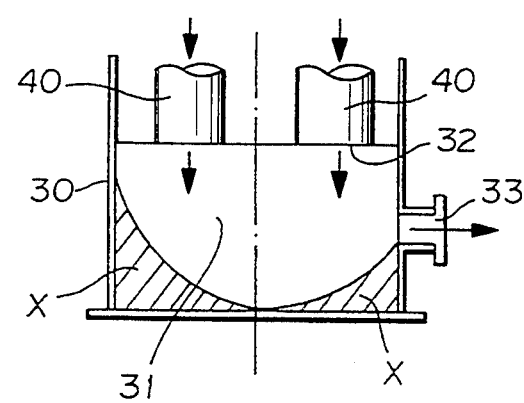
FIG. 7 is a partial sectional view of another prior art filter apparatus.

Under the conditions described above, a number of tape samples were prepared using the three types of filter apparatus (see Example 1). For each sample, the number of streaks in the coating (checked visually, per 150 m of coating length) was counted. Also, the values of T/τ were calculated for the respective filter housings used to prepare the samples. The relationship between streaking and T/τ is depicted in FIG. 5. Numerical data for Sample Nos. 1 to 5 were mean values obtained by repeating five cycles of coating operation using the same filter housing.

As is clear from FIG. 5, an improvement in the quality of coated surfaces could be accomplished very effectively when T/τ was 0.95 and more.

What is claimed is:

1. A method for evaluating a filter apparatus for use in filtering a thixotropic fluid, said filter apparatus having a housing with an interior volume V, and a filter provided within the interior of the housing in such a way that the filter divides the interior into a primary region and a secondary region having a dead space, the method comprising the steps of:
providing a first solution;
providing a second solution which differs from the first solution in one characteristic so that the first solution can be distinguished from the second solution;
placing said first solution in every part of said housing;
displacing said first solution in every part of said housing with said second solution;
recovering a filtered solution from said secondary region;
measuring a duration of time, Θ, required for said filtered solution to change from consisting of only said first solution to consisting of only said second solution;
calculating a mean residence time H, where H=V/v and where v is a flow velocity in the filter apparatus for said first and second solutions;
calculating an index Θ/H; and
accepting said filter apparatus only if said index Θ/H>0.95.

2. A method for filtering a thixotropic fluid using a filter apparatus having a housing with an interior volume V, a filter provided within the interior of the housing in such a way that the filter divides the interior into a primary region and a secondary region having a dead space, said filter apparatus having an index Θ/H>0.95, which is determined by:
providing a first solution;
providing a second solution which differs from the first solution in one characteristic so that the first solution can be distinguished from the second solution;
placing said first solution in every part of said housing;
displacing said first solution in every part of said housing with said second solution;
recovering a filtered solution from said secondary region;
measuring a duration of time, Θ, required for said filtered solution to change from consisting of only said first solution to consisting of only said second solution;
calculating a mean residence time H, where H=V/v and where v is a flow velocity in the filter apparatus for said first and second solutions;
calculating the index Θ/H;
supplying said thixotropic fluid to said filter apparatus; and
passing said thixotropic fluid from said primary region through said filter into said secondary region.

3. The method according to claim 2, wherein said step of supplying said thixotropic solution to said filter apparatus comprises supplying a thixotropic solution having a viscosity variable with shear rate, wherein $\eta_1$ is the viscosity of said thixotropic solution at a shear rate of 20 cm$^{-1}$ and $\eta_2$ is the viscosity of said thixotropic solution at a shear rate of 46,500 cm$^{-1}$ and where a relation $\eta_1/\eta_2 \geq 250$.

* * * * *